Patented Sept. 5, 1922.

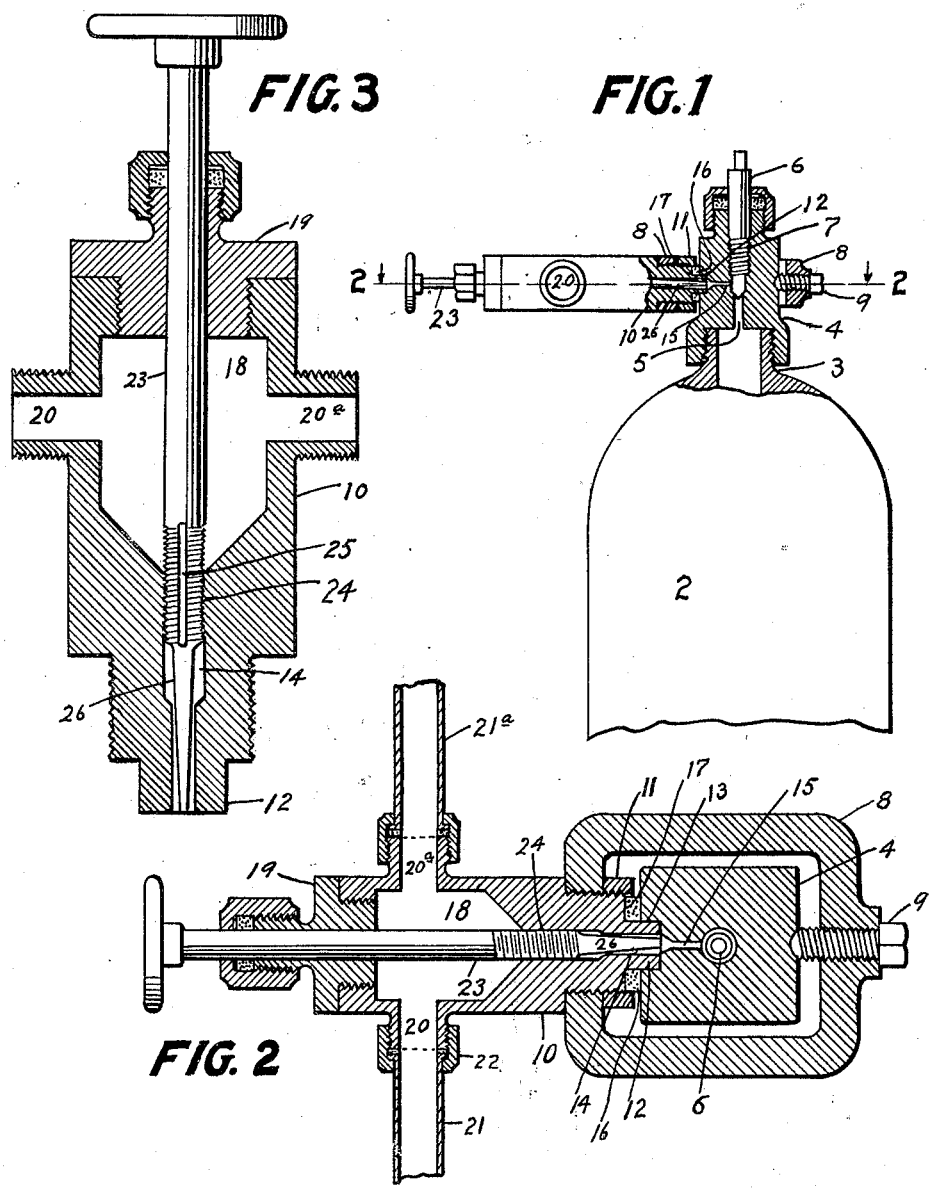

1,427,854

UNITED STATES PATENT OFFICE.

CLARENCE B. ROGERS, OF SEATTLE, WASHINGTON.

VALVE FOR HIGH-PRESSURE GAS REGULATION.

Application filed July 31, 1919. Serial No. 314,573.

*To all whom it may concern:*

Be it known that I, CLARENCE B. ROGERS, a citizen of the United States, resident of Seattle, county of King, State of Washington, have invented certain new and useful Improvements in Valves for High-Pressure Gas Regulation, of which the following is a specification.

The object of my invention is to provide an improved valve by means of which the delivery of gas under high pressure and particularly oxygen gas for mixture with an illuminating or hydrogen gas can be easily and accurately controlled and the desired mixture of the two gases effected.

The invention consists generally in various constructions and combinations, all as hereinafter described and particularly pointed out in the claims.

In the accompanying drawings forming part of this specification,

Figure 1 is a partial view of an oxygen gas container showing my attachment and regulating valve mounted thereon, Figure 2 is a sectional view on the line 2—2 of Figure 1, Figure 3 is a sectional view through the yoke in which the regulating valve is mounted.

In the drawing, 2 represents the oxygen gas container, having a neck 3 on which the head 4 is mounted, the neck being exteriorly threaded preferably to enter a socket in the head. This head has a passage 5 therein communicating with the tank and a valve 6 is mounted to close said passage and is threaded to fit the interiorly threaded passage 7 in the head. 8 represents a yoke adapted to fit over the head 4 and secured thereon by suitable means, such as a set screw 9. A plug 10 is tapped into the yoke 8 on one side and secured therein by means of a nut 11 and has an inner end 12 that is seated in a socket 13 in the head 4 and is provided with a duct 14 adapted to register with a port 15 in the wall of the head which communicates with the duct 5 and through which the oxygen gas is conducted to the passage 14. A gasket 16 is preferably provided between the wall of the head 4 and a shoulder 17 on the plug. This gasket effectually closes the joint between the plug and the head. Within the plug a mixing chamber 18 is formed, having a cap 19 at one end through which access may be had to the chamber and provided on one side with a port 20 which communicates with a tube 21 leading from the gas tank not shown, illuminating gas being preferably used for mixture with the oxygen. A suitable coupling 22 is provided for connecting the tube 21 with the plug. On the opposite side a similar passage 20ª is provided with a tube 21ª which leads to the tip of the blow pipe not shown.

23 represents a regulating valve mounted in the cap 19 and projecting through the mixing chamber and having threaded engagement with a passage 24 which leads from the mixing chamber to the passage 14. The threads are cut away on one side, as indicated at 25, to allow the passage of the gas to the mixing chamber and the inner end of the valve has a tapered portion 26 from which the threads have been omitted, extending through the gas passage 14 and adapted to enter the port 15 of the head and regulate the flow of gas therethrough. This valve is slow-moving and is normally in the position shown for regulating the flow of oxygen to the mixing chamber.

I claim as my invention:

1. The combination, with an oxygen gas container having a head provided with a gas duct and a valve for closing said duct, of a member mounted on said head and having a mixing chamber therein and pipes for connection with an illuminating gas supply and with a blow pipe respectively communicating with said mixing chamber, said member having a duct communicating with the duct in said head and with said mixing chamber, and a regulating valve passing through said mixing chamber in the path of the flow of the illuminating gas therethrough and tapped into said duct for regulating the volume of the oxygen gas delivered through said duct to said chamber.

2. The combination, with a gas container having a head mounted thereon provided with a gas duct and a valve for opening or closing said duct, of a member mounted on said head and having a mixing chamber therein a pipe adapted to lead from a gas supply to said mixing chamber and a pipe from said mixing chamber adapted for connection with a blow pipe, said member having a gas duct communicating with the duct in said head and a regulating valve mounted in said member and projecting through said mixing chamber in the path of the gas flowing therethrough and projecting into the gas duct in said member for regulating the flow of gas from said container to said chamber.

3. The combination, with a gas container, of a head mounted thereon and provided with a gas duct and valve therefor, a yoke mounted on said head, a plug tapped into said yoke and having a mixing chamber therein and a duct communicating with said mixing chamber and with the duct in said head, pipes for connection with a source of gas supply and a blow pipe respectively and communicating with said mixing chamber and a valve mounted in said plug and having a tapered end projecting into the gas duct therein for regulating the flow of gas from said container to said mixing chamber.

4. The combination, with a gas container, of a member mounted thereon and having a mixing chamber and a duct leading from said mixing chamber to said container, pipes communicating with said chamber on opposite sides thereof for connection with a source of gas supply and with a blow pipe respectively, and a regulating valve passing through said mixing chamber in the path of the gas flowing therein for regulating the admission of gas to said chamber from said container.

5. The combination, with a gas container, of a member mounted thereon having a mixing chamber and a duct leading from the mixing chamber to said container, pipes communicating with said chamber for connection with a source of gas supply and a blow pipe respectively, and means mounted in said mixing chamber in the path of the gas flowing therein for regulating the admission of gas to said chamber from said container.

In witness whereof, I have hereunto set my hand this 15th day of July, 1919.

CLARENCE B. ROGERS.